United States Patent Office 2,809,462
Patented Oct. 15, 1957

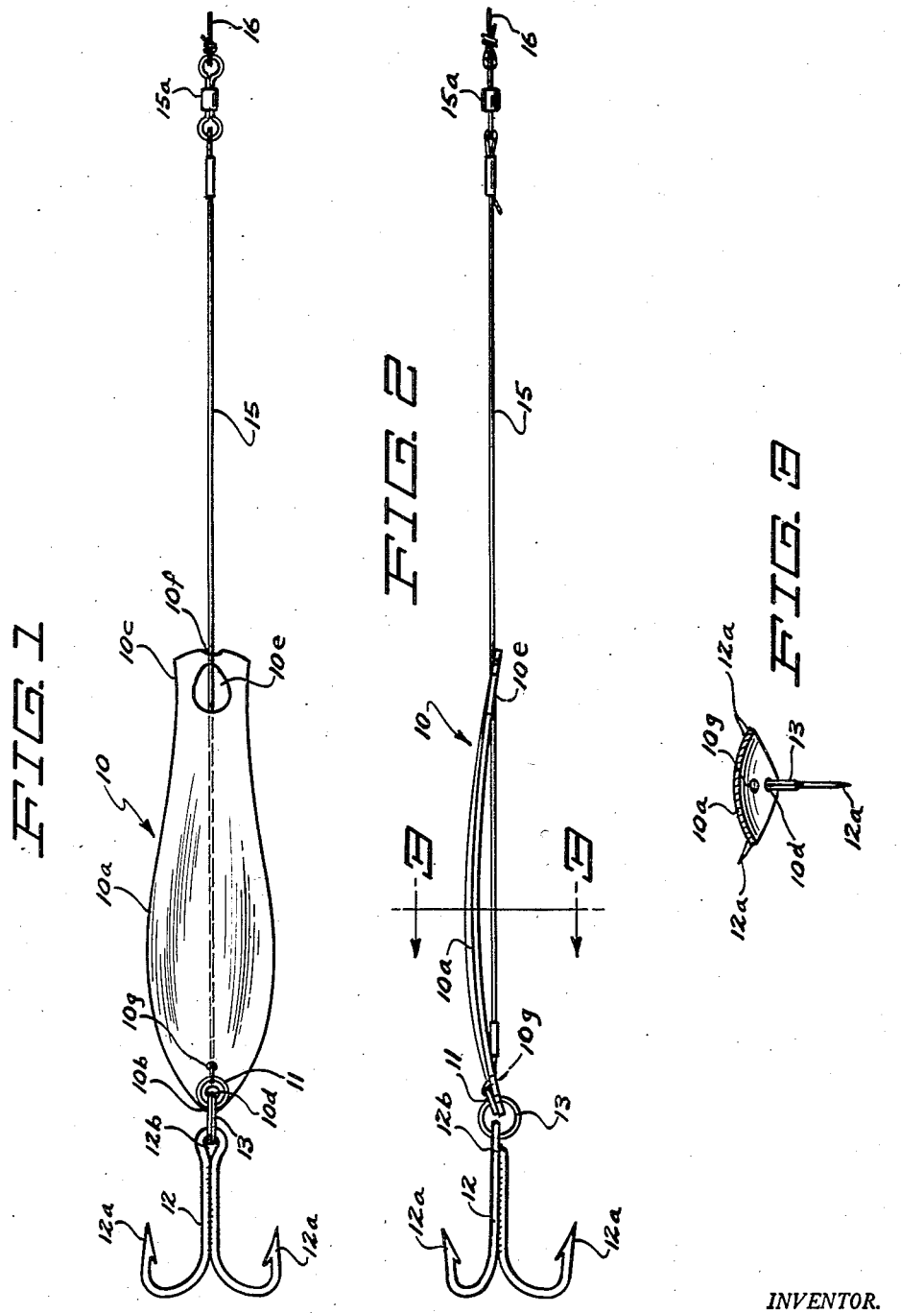

2,809,462
ARTIFICIAL FISHING BAIT

Ralph C. Wallis, St. Paul, Minn., assignor to Brainerd Bait Co., St. Paul, Minn., a corporation of Minnesota Application May 13, 1954, Serial No. 429,451

1 Claim. (Cl. 43—42.08)

This invention relates to an artificial bait and more particularly to the type of artificial bait of the well known spoon type. Artificial baits generally in use are pulled through a body of water by a leader and fishing line. Success in fishing with the use of an artificial bait depends substantially on unusual characteristics or attributes of said bait in simulating the action of a minnow. It has been found that a very desirable and an entirely new motion of an artificial bait in operation can be secured in having a bait pushed through a body of water instead of being pulled through a body of water. It has been found very desirable to have a non-rotatable bait which has a transversely undulating movement when in motion as it progresses through water by being pushed therethrough.

It is an object of this invention to provide an artificial bait of the spoon type which is adapted to be pushed through a body of water from its rear end.

It is another object of this invention to provide a non-rotatable artificial bait which has a transversely undulating motion when progressed through a body of water by being pushed.

It is a further object of this invention to provide an artificial bait comprising a dished or curved plate-like member having a hook pivotally connected to one end of said member, said member having an opening of substantial width at its other end and a leader of small transverse dimension being disposed through said opening and secured to said first mentioned end portion of said plate member whereby said member is pushed through a body of water in operation and said member can move laterally relatively to said leader.

It is more specifically an object of this invention to provide a fish bait comprising an elongated plate convexly concavely curved along its transverse and longitudinal axes to be convex on its lower side, a hook pivotally connected to one end of said plate, said plate having an opening of substantial width and length adjacent its other end and a leader passing downwardly through said opening and being secured adjacent said first mentioned end portion whereby said plate member is pushed as it is progressed through a body of water with a resulting transversely undulating motion.

These and other objects and advantages of the invention will be fully set forth in the following description made in connection with the accompanying drawings in which like reference characters refer to similar parts throughout the several views and in which:

Fig. 1 is a plan view of applicant's invention showing a portion in dotted line;

Fig. 2 is a view of applicant's invention in inverted position in side elevation; and Fig. 3 is a view of applicant's invention taken on line 3—3 of Fig. 2, as indicated by the arrows.

Referring to the drawings, applicant's invention is shown comprising a plate-like member 10. Said member 10 is convexly-concavely curved along its transverse and longitudinal axes so as to be concave or dished at one side. Said member is preferably made of metal sheet material. Said member 10 has a central body portion 10a and has its greatest width at this portion. Said member 10 has a rear end portion 10b which is tapered substantially to a point and has a front end portion 10c substantially reduced in its transverse dimension. Said end portion 10c has a concavely curved periphery having a slightly notched portion 10f. An opening 10d is provided at or adjacent said rear end portion of member 10 and an opening 10e of substantial length and width is provided adjacent its front end portion. A small ring 11 is provided which is adapted to overlie opening 10d. A triple hook 12 is provided having a plurality of barb-equipped shanks 12a at one end and having an aperture 12b adjacent its other end. A ring 13 is provided which is disposed through opening 10d, ring 11 and opening 12b, thereby pivotally connecting hook 12 with member 10 and with ring 11. A small opening 10g is provided spaced forwardly of opening 10d. A leader 15 is provided. Said leader may be made of any suitable material and is here disclosed as comprising a flexible wire which may be plastic coated. Said leader 15 passes rearwardly and downwardly through opening 10e in the inverted position of the lure shown in Fig. 2, under plate member 10 and upwardly through opening 10g to have one end secured to ring member 11. A swivel 15a is secured to the forward end of said leader 15. A fishing line 16 is secured to the forward end of said swivel 15a.

In operation, said member 10 will be moved forwardly through the water by line 16 and leader 15. Said line is secured to ring 11 which is connectingly held to member 10 by ring 13. As is well known, a spoon does not rotate in the water as does a spinner. Said member 10 may be used for either casting or trolling. It will be noted that in contrast to the common and prior spoon baits that member 10 is propelled from its rear end, or in other words is pushed through the water. Artificial baits have previously been pulled from their front ends. Hence the action of leader 15 in moving member 10 through a body of water will be a pushing action as member 10 is propelled or progressed forwardly from its rear end. Said pushing action gives member 10 an altogether novel and peculiar rocking motion. Member 10 will have a transversely undulating motion in that it will have movement from side to side and upwardly and downwardly simultaneously. Member 10 can have appreciable sidewise or lateral motion relatively to leader 15 with said leader being connected to said ring 11 and there is considerable and greater lateral movement made possible by the width of opening 10e.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claim.

What is claimed is:

An artificial bait comprising an elongated plate member being convexly-concavely curved along its transverse and longitudinal axes, said plate member tapering from its central longitudinal portion to form a slightly curved front end portion and a substantially pointed rear end portion, said plate member having an opening adjacent its rear end, a ring disposed through said opening, a hook secured to said ring, said plate member having a small opening spaced forwardly of said first mentioned opening, said plate member having an opening of substantial width adjacent its front end, said openings being axially aligned, a flexible leader having one end portion extending through said last mentioned opening and through said second mentioned opening to have said leader extend adjacent the longitudinally concave portion of said plate member, a second ring connecting said end of said leader and said first mentioned ring whereby said leader passes through said plate member and said leader and said hook are connected to a common ring.

References Cited in the file of this patent

UNITED STATES PATENTS

| | | |
|---|---|---|
| 1,861,905 | Bergstedt | June 7, 1932 |
| 2,290,433 | Jeffers | July 21, 1942 |
| 2,375,290 | Docteur | May 8, 1945 |
| 2,522,179 | Jensen et al. | Sept. 12, 1950 |
| 2,570,474 | Novitsky | Oct. 9, 1951 |
| 2,577,402 | Carnes | Dec. 4, 1951 |

FOREIGN PATENTS

| | | |
|---|---|---|
| 83,543 | Norway | Apr. 20, 1954 |